United States Patent [19]
Rosenshine

[11] Patent Number: 5,431,468
[45] Date of Patent: Jul. 11, 1995

[54] AUXILIARY HANDLE FOR A SHOVEL

[76] Inventor: Howard Rosenshine, 436 Taylor Rd., Exton, Pa. 19341

[21] Appl. No.: 255,449

[22] Filed: Jun. 8, 1994

[51] Int. Cl.[6] ............................. A01B 1/22; B25G 3/38
[52] U.S. Cl. ....................................... 294/58; 294/54.5
[58] Field of Search ................... 294/50.8, 54.5, 57-59; 16/111 R, 112; 254/131.5; 172/371, 372

[56] References Cited

U.S. PATENT DOCUMENTS

| | | | |
|---|---|---|---|
| 541,841 | 7/1895 | Doyle | 294/50.8 X |
| 626,959 | 6/1899 | Avery et al. | 294/50.8 |
| 789,657 | 5/1905 | Eby | 294/50.8 X |
| 911,291 | 2/1908 | Byor . | |
| 933,647 | 9/1909 | Hunt . | |
| 1,194,197 | 8/1916 | Jones . | |
| 1,374,061 | 4/1921 | Coleman . | |
| 1,456,879 | 5/1923 | Newman . | |
| 1,586,056 | 5/1926 | Walsh . | |
| 2,416,414 | 2/1947 | Spencer . | |
| 2,531,227 | 11/1950 | Lubins . | |
| 2,769,612 | 11/1956 | Weisheit | 254/131.5 |
| 2,772,910 | 12/1956 | Doyle . | |
| 2,826,835 | 3/1958 | O'Shea . | |
| 3,082,554 | 3/1963 | Steeb . | |
| 4,050,728 | 9/1977 | Davidson . | |
| 4,103,954 | 8/1978 | Vaslas . | |
| 4,200,324 | 4/1980 | Helton . | |
| 4,264,096 | 4/1981 | Barnett . | |
| 4,537,433 | 8/1985 | Yang | 294/58 |
| 4,538,847 | 9/1985 | Lapshansky . | |
| 4,615,553 | 10/1986 | Hultine . | |
| 4,787,661 | 11/1988 | Rutledge . | |
| 4,793,645 | 12/1988 | Decker . | |
| 4,944,541 | 7/1990 | Waldschmidt . | |
| 5,054,830 | 10/1991 | Nisenbaum . | |

FOREIGN PATENT DOCUMENTS

| | | | |
|---|---|---|---|
| 410274 | 3/1925 | Germany . | |
| 322531 | 12/1929 | United Kingdom | 294/58 |
| 568515 | 4/1945 | United Kingdom . | |
| 2156641 | 10/1985 | United Kingdom . | |
| 9117647 | 11/1991 | WIPO | 294/58 |

Primary Examiner—Dean Kramer
Attorney, Agent, or Firm—Dann, Dorfman, Herrell and Skillman; Henry H. Skillman

[57] ABSTRACT

An auxiliary handle for assembly to a main shaft of a snow shovel is provided. The auxiliary handle includes an elongated auxiliary shaft and a fixture that connects the auxiliary shaft to the main shaft of the shovel. The fixture includes a housing that is pivotally mounted to the auxiliary shaft. A pin connects the housing to the main shaft allowing pivotal movement of the auxiliary shaft relative to the main shaft. A two-stage spring interposed between the shafts regulates the pivotal movement of the auxiliary shaft. The auxiliary shaft is slidably mounted and guided in the fixture, which permits longitudinal displacement of the auxiliary shaft relative to the main shaft, but prevents rotation of the auxiliary shaft about its axis. A lock regulates the longitudinal movement of the auxiliary shaft and simultaneously locks the auxiliary shaft to the bracket thereby preventing further pivotal movement of the auxiliary shaft.

15 Claims, 2 Drawing Sheets

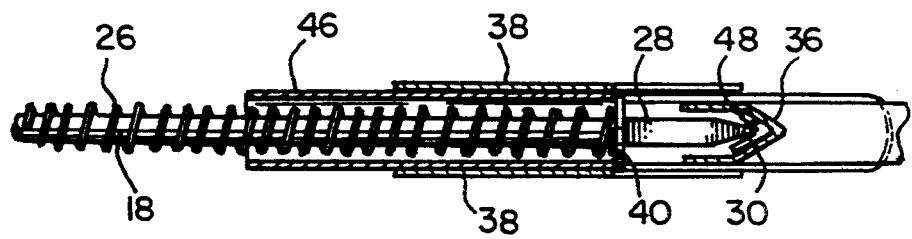
FIG. 3
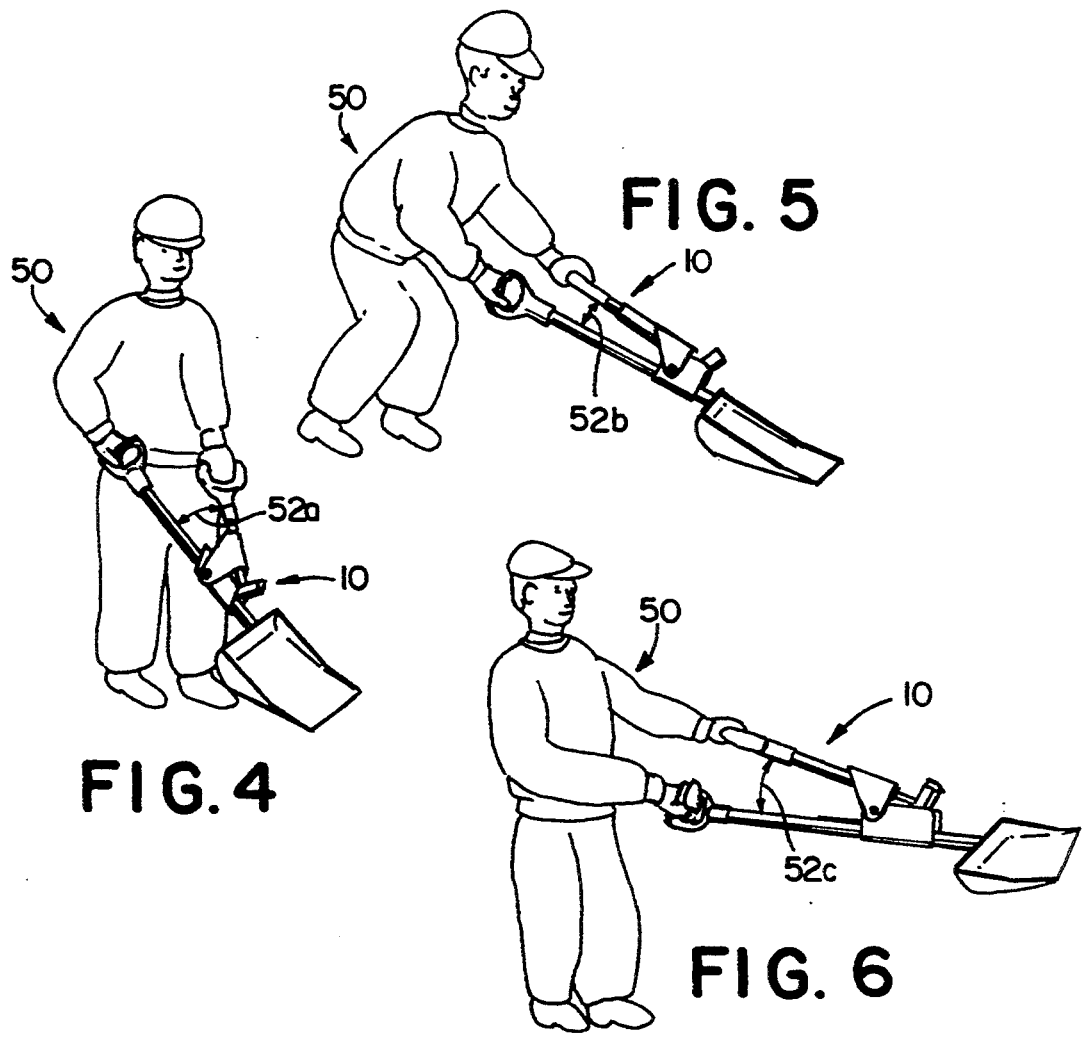
FIG. 5
FIG. 4
FIG. 6

AUXILIARY HANDLE FOR A SHOVEL

FIELD OF THE INVENTION

The present invention generally relates to an auxiliary handle for a shovel and, more specifically, to an auxiliary handle that may be used with a conventional snow shovel to improve the usefulness of the shovel.

BACKGROUND OF THE INVENTION

A conventional shovel, comprising a shaft that interconnects a hand grip and a blade, is relatively useful for shoveling. During use, a user generally holds the shovel by positioning one hand on the hand grip and the other hand along the shaft near the blade. The shovel is held in this manner throughout the shoveling process, which can be broken down into three distinct motions including: scraping (or digging), lifting, and throwing. As a consequence of holding the shovel near the blade, the user must repeatedly bend at the waist during the scraping motion and straighten while bearing the full load of the shovel during the lifting and throwing motions. Such repeated bending and straightening creates a great deal of stress on the user's back resulting in back injuries and premature fatigue.

In order to alleviate back injuries and to improve shoveling efficiency, it has been proposed that an auxiliary handle be connected to the conventional shovel. In one configuration, an auxiliary handle, including an auxiliary shaft and an auxiliary hand grip, is securely attached at a fixed angle to the shaft of the shovel. The angle and length of the auxiliary handle is selected so that, while shoveling, the auxiliary hand grip extends upwardly to approximately the height of the user's waist. As a result, the user may grasp the auxiliary hand grip without bending at the waist during the scraping motion. Although the two-grip configuration minimizes the need for bending and consequently, reduces the likelihood of back injury, the fixed positioning of the grips results in a very cumbersome throwing motion. The natural tendency is for the user's hands to move together during throwing, however, the fixed spacing between the hand grips inhibits such movement.

To improve the throwing motion, the auxiliary handle may be hinged to the shaft of the shovel, rather than securely fastened at a fixed angle to the shaft. This arrangement permits pivotal movement of the auxiliary shaft toward the shovel shaft so that the user's hands can move together during the throwing motion. Other auxiliary handle configurations utilize a spring connected between the shovel shaft and auxiliary shaft to bias the shafts together in order to further enhance the throwing motion.

A problem associated with hinged auxiliary shafts is that unrestricted pivotal movement can cause the user's hands to collide together. This situation is exacerbated by the configurations employing a spring to bias the shovel and auxiliary shafts together.

An additional problem with hinged auxiliary shafts is that, during scraping, the user must expend a great deal of effort to prevent pivotal motion of the auxiliary shaft relative to the main shaft. For optimal scraping or digging, it is desired that the auxiliary shaft remain fixed relative to the main shaft.

In accordance with the present invention, an improved auxiliary handle is provided for use with a conventional shovel. The use of the auxiliary handle, in accordance with the present invention, solves the problems associated with conventional shovels and prior auxiliary handles.

SUMMARY OF THE INVENTION

The present invention provides an improved auxiliary handle for assembly to an elongated main shaft of a conventional shovel. The auxiliary handle includes an elongated auxiliary shaft with a hand grip on one end so that a user can conveniently grasp the auxiliary handle. The other end of the auxiliary shaft is pivotally connected to the main shaft of the shovel.

The assembly includes a bracket supported on the main shaft of the shovel and a housing supporting the auxiliary shaft. Pivot means join the bracket and housing permitting pivotal movement of the housing relative to the bracket so that the auxiliary shaft can move pivotally relative to the main shaft of the shovel. The pivot means may be in the form of a pin that connects the housing to the bracket.

The present invention also includes a spring means that is interposed between the auxiliary shaft and the main shaft of the shovel which biases the auxiliary shaft away from the main shaft and provides a cushioning effect during pivotal movement of the auxiliary shaft toward the main shaft. As a result, the likelihood of a user's hands colliding during the throwing motion is significantly reduced. More specifically, the spring means operates in two stages. A torsion spring biases the auxiliary shaft away from the main shaft, and a coil spring increases the bias after the auxiliary shaft pivots a selected distance. A stop, which cooperates with the coil spring prevents any further pivotal movement of the auxiliary shaft toward the main shaft.

The assembly also includes a mounting means that permits slidable mounting of the auxiliary shaft within the pivot housing. In particular, a sleeve on the housing is provided and allows generally forward and rearward longitudinal displacement of the auxiliary shaft relative to the housing, as well as the main shaft of the shovel. A guide prevents the auxiliary handle from rotating within the sleeve.

Locking means is provided to stop longitudinal movement of the auxiliary shaft after a predetermined distance of travel. The locking means also locks the auxiliary handle to the bracket, thus preventing pivotal movement of the auxiliary shaft. In the illustrated embodiment, an extension, in the form of a wedge, is provided on the auxiliary shaft, and a trough is provided on the bracket, and these components cooperate to automatically lock the auxiliary shaft at any desired angular position when pressure is asserted against the auxiliary handle. As a result, the user is in effect provided with a fixed angle auxiliary handle during scraping or digging.

BRIEF DESCRIPTION OF THE DRAWINGS

The following summary as well as the following detailed description of the preferred embodiments of the present invention will be better understood when read in conjunction with the appended drawings, in which:

FIG. 3 is a fragmentary sectional view of the auxiliary handle taken along line 3—3 of FIG. 2;

FIG. 4 is an illustration of the shovel assembly of FIG. 1 showing the position of a user and the shovel assembly at the start of a shoveling motion;

FIG. 5 is an illustration of the shovel assembly of FIG. 1 showing the position of a user and the shovel assembly at the completion of a scraping motion; and FIG. 6 is an illustration of the shovel assembly of FIG. 1 showing the position of a user and the shovel assembly during a throwing motion.

DETAILED DESCRIPTION OF THE PREFERRED EMBODIMENTS

Figure 1:
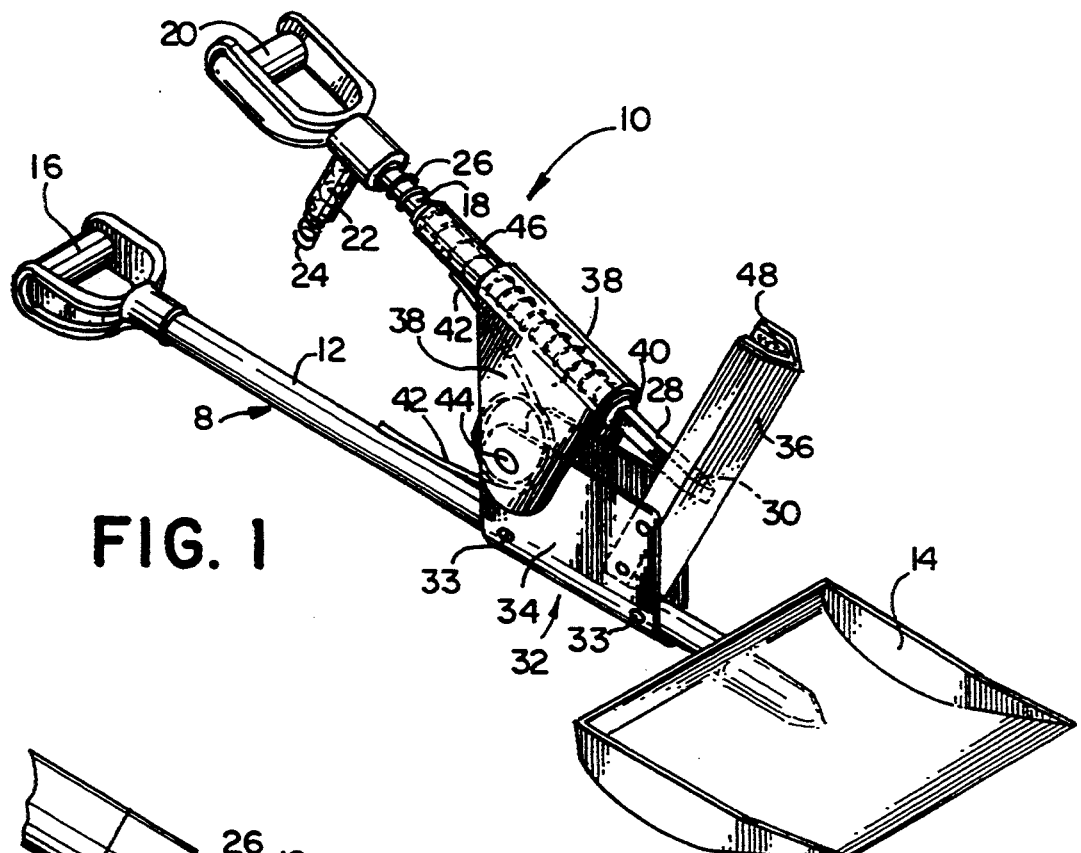
FIG. 1 is a perspective view of a snow shovel assembled with an auxiliary handle, in accordance with the present invention.

Referring to FIG. 1, an auxiliary handle, generally designated 10, is provided. As illustrated, the auxiliary handle is connected to a conventional snow shovel, generally designated 8, having a main hand grip 16, main shaft 12 and blade 14. The auxiliary handle 10 may be assembled to the shovel 8 during manufacture of the shovel. Alternatively, the auxiliary handle assembly 10 may be provided separately for subsequent attachment to any conventional shovel, such as a snow shovel or garden spade.

The auxiliary handle assembly 10 includes an auxiliary shaft 18 having a hand grip 20 at one end and a non-cylindrical extension 28 terminating with a wedge 30 at the other end. The assembly 10 also includes a fixture, generally designated 32, which connects the auxiliary shaft 18 to the main shaft 12 of the shovel 8.

The fixture 32 includes a bracket 34 that securely attaches to the lower portion of the main shaft 12 close to the shovel blade 14. The bracket 34 is U-shaped and may be designed so that it conforms to a majority of available shovel shafts, which are generally cylindrical in shape. If desired, the bracket 34 may be adapted to universally fit any type of shovel shaft. Two bolts 33, passing through the main shaft 12, hold the bracket 34 securely to the main shaft 12 and prevent rotation of the housing 34 about the shaft 12. Such mounting of the bracket 34 to the main shaft 12 requires drilling of holes in the main shaft 12. Alternatively, the bolts may be located at a higher position on the bracket 34 and a clamping action resulting from a tightening of the bolts may be utilized to retain the housing 34 in position.

The fixture 32 also includes a housing 38 in the form of a yoke, which is connected to the bracket 34 by pivot means. More specifically, a pin 44 joins the bracket 34 and the housing 38 and thus permits pivotal movement of the housing 38 relative to the bracket 34. Although a pin 44 is shown connecting the bracket 34 to housing 38, other connecting means, such as rivets or bolts, may be utilized.

The housing 38 includes mounting means to permit mounting of the auxiliary shaft 18 to the housing. An elongated tube or sleeve 46 near the top portion of the housing 38 serves this purpose. The interior diameter of the sleeve 46 is dimensioned to be slightly greater than the outside diameter of the auxiliary shaft 18 to permit longitudinal forward and rearward movement of the shaft 18 within the sleeve 46. The sleeve 46 of the housing 38 also interconnects the auxiliary shaft 18 to the bracket 34 and thus, allows pivotal movement of the auxiliary shaft 18 relative to the main shaft 12.

Pivotal movement of the auxiliary shaft 18 is regulated by spring means that operates in two stages. The first stage includes a torsion spring 42, which is interposed between the main shaft 12 and the auxiliary shaft 18 and mounted on the pin 44. The two ends of the torsion spring 42 extend so that one end abuts the main shaft 12 and the other end abuts the sleeve 46. Thus, when the user grips the handles 16 and 20 with two hands, and the auxiliary shaft 18 is subjected to closing pressure so that it pivotally moves toward the main shaft 12, the torsion spring 42 compresses and thereby biases the auxiliary shaft 18 away from the main shaft 12. The compression of the spring 42 resists the closing pressure and cushions the pivotal movement of the auxiliary shaft 18 toward the main shaft 12, and consequently, reduces the likelihood of the user's hands colliding with each other or with the other handle. In addition, the spring bias increases as the auxiliary shaft 18 moves closer to the main shaft 12.

The probability of hand collisions is further reduced through the use of the second stage of the spring means. In particular, a coil spring 24 and a stop 22 are provided. The stop 22, cylindrical in shape, is mounted along the auxiliary shaft 18. The stop has a cylindrical cavity, which faces away from the auxiliary shaft 18 and toward the main shaft 12. The coil spring 24 has a diameter that is slightly smaller than the diameter of the cylindrical cavity of the stop 22 and one end is anchored within the cavity. The other end of the coil spring 24 extends outside the cavity, also toward the main shaft 12. During pivotal movement of the auxiliary shaft 18 toward the main shaft 12, the coil spring 24 engages the main shaft. This engagement, as well as further movement of the auxiliary shaft 18, causes the coil spring 24 to compress into the cavity of the stop 22. The compression of the coil spring 24, now in concert with the compression of torsion spring 42, further increases the resistance to pivotal movement of the auxiliary shaft 18. In the event that the coil spring 24 is completely compressed into the cavity of the stop 22, the main shaft 12 engages the stop 22 and pivotal movement of the auxiliary shaft 18 terminates. Upon release of closing pressure on the auxiliary shaft 18, the torsion spring 42 and coil spring 24 cooperate to return the shaft 18 to its original position.

Longitudinal movement of the auxiliary shaft 18 is regulated by a coil spring 26, which encircles the auxiliary shaft 18 along most of its length and fits within the sleeve 46. When pressure is applied to the handle 20, it tends to move forwardly against the bias of the spring 26. During forward longitudinal movement of the auxiliary handle 18, the spring 26 is compressed into the sleeve 46 and thus, biases the auxiliary shaft 18 in a rearward direction. After the pressure is released, the coil spring 26 returns the auxiliary handle 18 to its original position.

Rotation of the auxiliary shaft 18 about its longitudinal axis is prevented by a guide 40 on the housing 38. The guide 40 cooperates with a non-cylindrical bar 28 that extends from the auxiliary shaft 18. The guide 40 has a hole conforming to the contour of the bar, which permits longitudinal movement of the bar within the guide, however, limits rotational movement of the bar 28, as well as the auxiliary shaft 18. In the illustrated embodiment of the invention, the bar 28 is square, as is the hole in the guide 40. Alternative means may be provided for preventing axial rotation of the auxiliary shaft 18. For example, a single flat on the outer surface of the shaft 18 and guide of like profile may be utilized to achieve a similar result, or the tube 46 may be non-circular and the handle may have a complementary non-circular outline.

Figure 2:
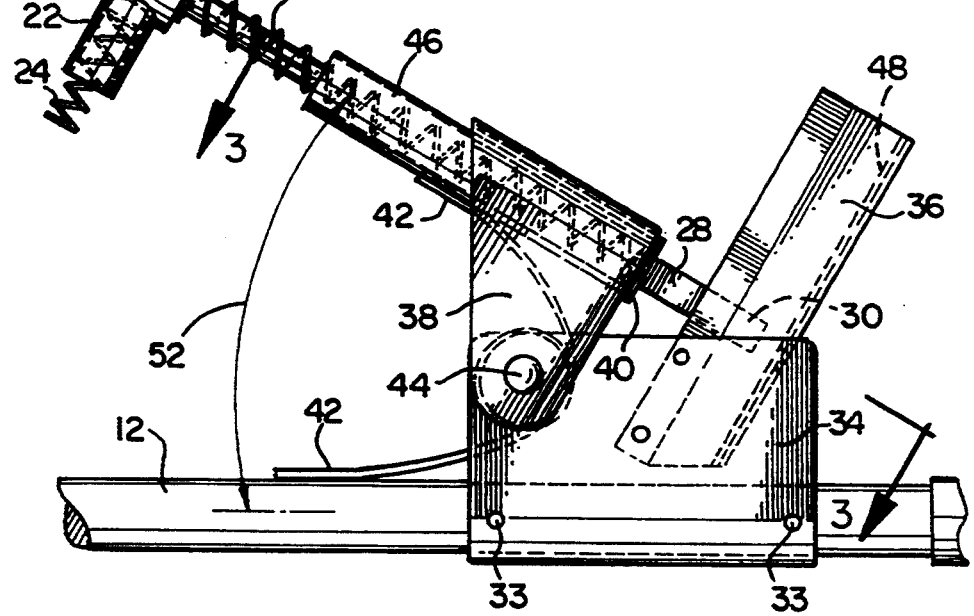
FIG. 2 is a fragmentary side view, partially cut away, of the snow shovel of FIG. 1 showing details of the auxiliary handle.

Locking means is provided to respond to longitudinal movement of the auxiliary shaft 18 within the sleeve 46. In the illustrated embodiment of the invention, the end of the bar 28 is formed into a wedge 30, which conforms to the inside contour of a trough 36. As shown in FIG. 2, the trough 36 is securely mounted to the bracket 34 at generally a right angle relative to the longitudinal axis of the auxiliary shaft 18. During forward longitudinal displacement of the auxiliary shaft 18, the wedge 30 contacts and frictionally engages with the trough 36. The frictional engagement automatically locks the auxiliary shaft 18 in its angular position and in turn prevents any further forward displacement of the shaft 18. The outer surfaces of the wedge 30 and the trough 36 are coated with a high-friction material, such as rubber. Therefore, when the wedge 30 engages with the trough 36, upward and downward movement of the wedge 30 within the trough 36 is prevented. Consequently, pivotal movement of the auxiliary shaft 18 relative to the main shaft 12 is also prevented. Thus, the natural shoveling motion of the user during scraping or digging automatically locks the angle of the auxiliary handle relative to the main handle. When the user lifts and subsequently throws the load, the auxiliary handle automatically unlocks and pivots in the desired fashion.

In operation, a user 50 initially holds hand grips 16 and 20 at a comfortable distance and angle at 52a, as shown in FIG. 4. At this point, the torsion spring 42 is uncompressed and the auxiliary shaft 18 is fully extended in a rearward longitudinal direction. To initiate the digging or scraping motion, the user 50 simultaneously pushes forward on the hand grips 16 and 20. Such a motion moves the entire shovel 8 including the auxiliary handle 10 forward and, in addition, causes a forward displacement of the auxiliary shaft 18 relative to the main shaft 12. During forward displacement of the auxiliary shaft 18, coil spring 26 compresses and biases the auxiliary handle 18 in a rearward direction relative to the shaft 12.

As shown in FIG. 5, the natural movement of the user 50 may pivotally close the auxiliary shaft 18 toward the main shaft 12 during the scraping motion, if desired. The amount of pivotal movement and resulting angle at 52b between the auxiliary shaft 18 and the main shaft 12 varies among users. In any event, the two grip arrangement requires only minimal bending at the waist during the scraping motion.

After scraping is completed, the user 50 simultaneously lifts upwardly on hand grips 16 and 20 and throws the load toward a desired location. During the lifting and throwing motions, further pivotal movement of the auxiliary shaft 18 toward or away from the main shaft 12 is permitted, which results in a changed angle at 52c between the auxiliary and main shafts. The pivotal movement of the auxiliary shaft 18 is cushioned by the torsion spring 42 and, if it comes into play, by the coil spring 24. In addition, stop 22 limits the amount of pivotal movement toward the main shaft 12. Upon completion of the lifting and throwing motions, the auxiliary shaft 18 is returned to its original position by the torsion spring 42 and the coil spring 24, at which point the shoveling process can be repeated.

It will be recognized by those skilled in the art that changes or modifications may be made without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An auxiliary handle connected to an elongated main shaft of a shovel comprising:
   (a) an elongated auxiliary shaft;
   (b) a housing pivotally mounted to the main shaft and attached to said auxiliary shaft to permit pivotal movement of said auxiliary shaft relative to the main shaft; and
   (c) a torsion spring and a coil spring interposed between said auxiliary shaft and the main shaft of the shovel to bias said auxiliary shaft away from the main shaft during pivotal movement of said auxiliary shaft, said coil spring cooperating with said torsion spring to increase the bias of said auxiliary shaft away from the main shaft after a selected distance of pivotal movement of said auxiliary shaft toward the main shaft.

2. In a shovel which may be used first for digging or scraping work material, next for lifting the work material, and finally for throwing the work material, said shovel having an elongated main shaft as a primary handle,
   an auxiliary handle for connecting to the elongated main shaft comprising:
   (a) an auxiliary shaft of less length than the main shaft;
   (b) a fixture for connecting said auxiliary shaft to the main shaft of the shovel, said fixture having a housing pivotally mounted to the main shaft and attached to said auxiliary shaft to permit pivotal movement of said auxiliary shaft relative to the main shaft; and
   (c) torsion spring means interposed between said auxiliary shaft and the main shaft of the shovel to bias said auxiliary shaft away from the main shaft during pivotal movement of said auxiliary shaft, said bias allowing said shafts to move toward one another against said bias when using the shovel for throwing the work material.

3. The auxiliary handle as recited in claim 2 wherein said torsion spring means is such that upon pivotal movement of said auxiliary shaft toward the main shaft of the shovel the spring bias tending to displace said auxiliary shaft away from the main shaft increases.

4. The auxiliary handle as recited in claim 2 comprising a stop mounted to one of said shafts and extending toward the other of said shafts and operable upon pivotal movement of said auxiliary shaft toward the main shaft such that said stop engages the other shaft and thereby limits the distance of pivotal movement of said auxiliary shaft toward the main shaft during said throwing.

5. The auxiliary handle as recited in claim 2, said fixture comprising a bracket for attaching to the main shaft of the shovel, said bracket being pivotally mounted to said housing to permit pivotal movement of said auxiliary shaft relative to the main shaft.

6. An auxiliary handle connected to an elongated main shaft of a shovel comprising:
   (a) an elongated auxiliary shaft;
   (b) a housing pivotally mounted to the main shaft and slidably mounting said auxiliary shaft to permit forward and rearward longitudinal displacement of said auxiliary shaft relative to the main shaft, said housing permitting pivotal movement of said auxiliary shaft relative to the main shaft;

(c) means to bias said auxiliary shaft in a rearward direction relative to the main shaft; and (d) spring means interposed between said auxiliary shaft and the main shaft of the shovel to bias said auxiliary shaft away from the main shaft during pivotal movement of said auxiliary shaft.

7. The auxiliary handle as recited in claim 6 wherein said auxiliary shaft includes guiding means to prevent rotation of said auxiliary handle about its axis upon said longitudinal displacement of said auxiliary shaft.

8. The auxiliary handle as recited in claim 6 wherein said housing includes locking means for engaging said auxiliary shaft to arrest further longitudinal displacement of said auxiliary shaft.

9. The auxiliary handle as recited in claim 8 wherein upon arrest of longitudinal displacement of said auxiliary shaft, said locking means locks said auxiliary shaft to prevent pivotal movement of said auxiliary shaft relative to the main shaft.

10. An auxiliary handle connected to an elongated main shaft of a shovel comprising:

(a) an elongated auxiliary shaft;

(b) a housing connecting said auxiliary shaft to the main shaft of the shovel, said housing pivotally mounted to the main shaft and attached to said auxiliary shaft to permit pivotal movement of said auxiliary shaft relative to the main shaft;

(c) spring means interposed between said auxiliary shaft and the main shaft of the shovel to bias said auxiliary shaft away from the main shaft during pivotal movement of said auxiliary shaft;

(d) a stop having a cylindrical cavity mounted to one of said shafts and extending toward the other of said shafts and operable upon pivotal movement of said auxiliary shaft toward the main shaft such that said stop engages the other shaft; and (e) a coil spring having a first end anchored within said cavity and a second end extending outside of said cavity so that during pivotal movement of said auxiliary shaft toward the main shaft said coil spring compresses into said cavity while increasing the bias of said auxiliary shaft away from the main shaft and said stop limits the distance of pivotal movement of said auxiliary shaft toward the main shaft.

11. An auxiliary handle for connecting to an elongated main shaft of a shovel comprising:

(a) an elongated auxiliary shaft;

(b) a fixture for connecting said auxiliary shaft to the main shaft of the shovel, said fixture having a housing pivotally mounted to the main shaft and attached to said auxiliary shaft to permit pivotal movement of said auxiliary shaft relative to the main shaft;

(c) a torsional spring interposed between said auxiliary shaft and the main shaft of the shovel to bias said auxiliary shaft away from the main shaft during pivotal movement of said auxiliary shaft;

(d) a coil spring interposed between said auxiliary shaft and the main shaft of the shovel cooperating with said torsion spring to increase the bias of said auxiliary shaft away from the main shaft after a selected distance of pivotal movement of said auxiliary shaft toward the main shaft; and (e) a stop mounted to one of said shafts and extending toward the other of said shafts and operable upon pivotal movement of said auxiliary shaft toward the main shaft such that said stop engages the other shaft and thereby limits the distance of pivotal movement of said auxiliary shaft toward the main shaft.

12. The auxiliary handle as recited in claim 11 wherein said stop has a cylindrical cavity and wherein said coil spring has a first end anchored within said cavity and a second end extending outside of said cavity so that during pivotal movement of said auxiliary shaft toward the main shaft said coil spring compresses into said cavity while increasing the bias of said auxiliary shaft away from the main shaft and said stop limits the distance of pivotal movement of said auxiliary shaft toward the main shaft.

13. The auxiliary handle as recited in claim 11 wherein said auxiliary shaft is slidably mounted within said housing of said fixture to permit forward and rearward longitudinal displacement of said auxiliary shaft relative to the main shaft and wherein the auxiliary handle includes means to bias said auxiliary shaft in a rearward direction relative to the main shaft.

14. The auxiliary handle as recited in claim 13 wherein said fixture includes locking means for engaging said auxiliary shaft to arrest further longitudinal displacement of said auxiliary shaft.

15. The auxiliary handle as recited in claim 14 wherein upon arrest of longitudinal displacement of said auxiliary shaft, said locking means locks said auxiliary shaft to prevent pivotal movement of said auxiliary shaft relative to the main shaft.

* * * * *